May 21, 1929.  F. M. WEBSTER  1,714,199
RETURN TRAP
Filed Nov. 16, 1926

Patented May 21, 1929.

1,714,199

UNITED STATES PATENT OFFICE.

FRANK M. WEBSTER, OF WELLESLEY FARMS, MASSACHUSETTS, ASSIGNOR TO W. D. CASHIN CO., OF BOSTON, MASSACHUSETTS, A CORPORATION OF MASSACHUSETTS.

RETURN TRAP.

Application filed November 16, 1926. Serial No. 148,721.

This invention relates to traps of the type used in steam and vapor heating systems for accumulating the condensation from the return mains and intermittently releasing said condensation for return to the boiler.

It is the chief object of the invention to devise a trap of this character which will be usually reliable in operation, while at the same time being simple in construction and economical to manufacture.

The nature of the invention will be readily understood from the following description when read in connection with the accompanying drawings, and the novel features will be particularly pointed out in the appended claims.

Figure 1:
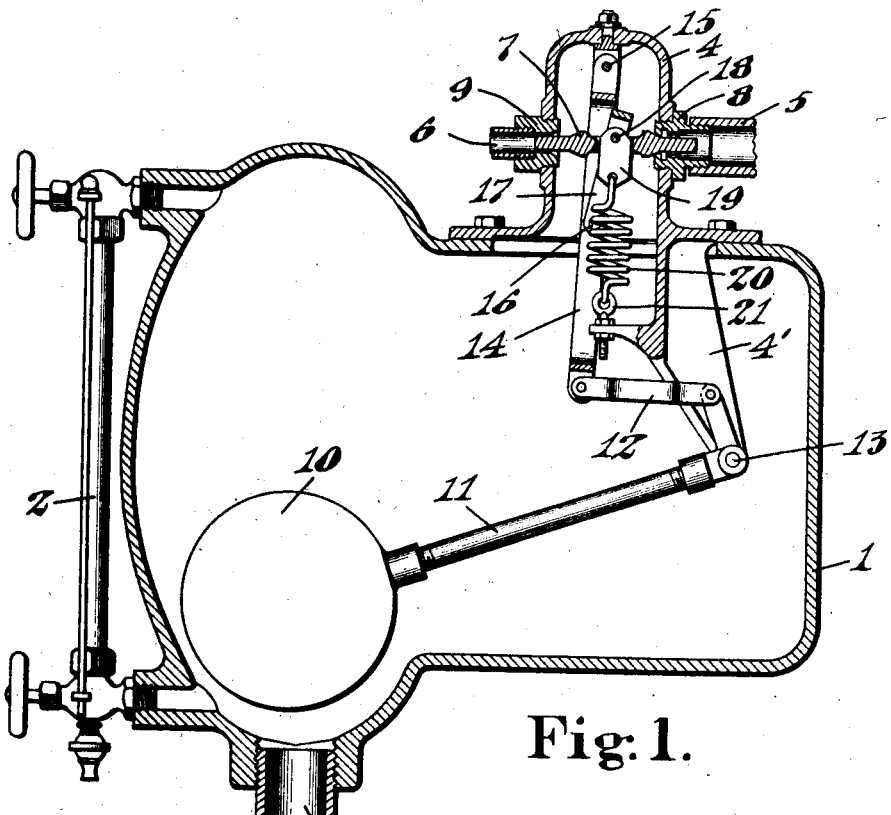
Figure 1 is a vertical, cross-sectional view showing a return trap constructed in accordance with this invention.

The construction shown comprises a tank or casing 1, preferably equipped with the usual gage glass 2. Tapped into the lower end of this casing is a pipe 3 which usually is connected to the return line between two check valves arranged to permit the water condensing in the heating or other system to flow into the trap casing 1, and also to flow from this trap into the boiler, but serving to prevent any reverse flow.

Bolted to the top of the trap casing 1 is a supplemental or valve casing 4 to which a steam line 5 leading from the boiler is connected. A vent pipe 6 leads from this casing. The admission of steam to the trap or the opening thereof to the vent is controlled by a valve 7 slidably mounted in valve seat members 8 and 9 which are in alinement with each other.

The operating mechanism for this valve comprises a float 10 mounted on the end of a rod 11 which is fulcrumed at 13 on a depending arm or bracket 4' formed integral with the valve casing 4. The float lever is connected by a link 12 to the lower end of a loop-shaped lever or toggle link 14 which is fulcrumed at 15 in the upper end of the casing 4. Pivoted at 16 on this lever and mounted between the arms thereof is a yoke-shaped link 17, the legs of which are pinched together near the upper end of this part, this end of the link extending through a slot formed in the central part of the valve 7. Located between the two arms of the link 17 and pivoted to them at 18 is a short plate 19, and the upper end of a coiled spring 20 is connected to the lower edge of this plate, the opposite end of said spring being fastened by an eye bolt 21 to a part of the bracket 4'. This whole structure including the valve element and its operating mechanism may be regarded as a valve unit.

Figures 2, 3:
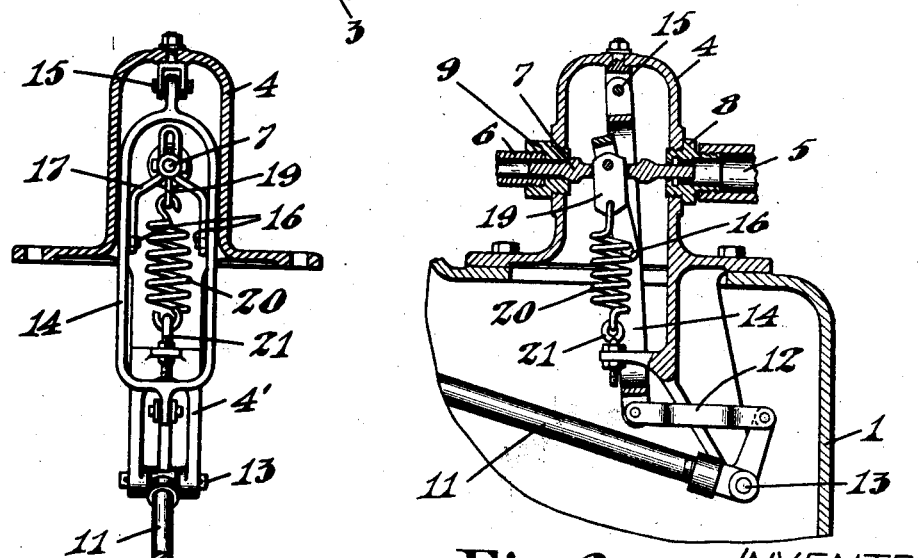
Fig. 2 is a fragmentary view similar to Fig. 1, but showing certain parts of the valve operating mechanism in a different position.
Fig. 3 is a cross-sectional view at right angles to Fig. 2 showing, in elevation, the valve operating mechanism which appears in the latter figure.

In installing this trap it is generally located adjacent to the boiler and at least several inches above the maximum water line in the boiler. Assuming that the parts are in the positions shown in Fig. 1, water condensing in the heating system will flow into the tank or casing 1 through the pipe 3, the air displaced by the water finding its way out of the tank through the vent 6. At this time the right hand valve member of the reciprocating valve 7 is held against its seat in the part 8 by means of the spring 20 operating through the toggle mechanism and holding it in its "broken" or collapsed position. Steam therefore is prevented from entering the casing 1 at this time. As the water level rises in the casing, the float 10 will rise with it, and this motion will be transmitted to the toggle link 14, swinging it toward the right. This movement has both the effect of straightening the toggle and also of tensioning the spring 20 since the straightening movement of the toggle will lift the point 18, and consequently the plate 19, as will be evident from an inspection of Fig. 1. Such a straightening motion of the toggle, however, does not produce any movement of the valve 7 due to the lost motion between the toggle mechanism and the valve. But the instant that the toggle mechanism is moved slightly past its straightened position, the spring 20 snaps the toggle into its collapsed position opposite to the position in which it is shown in Fig. 1. During this movement the plate 19 is thrown against the left hand edge, Figs. 1 and 2, of the slot in which it is positioned in the valve 7, and slides this valve with a snap movement into the position shown in Fig. 2 where its left hand valve member closes the vent. Steam now flows freely from the pipe 5 into the tank 1. Inasmuch as the tank is located above the water level in the boiler, and since the steam pressures in the boiler and tank 1 now are equalized, the water will flow by gravity out of the tank and into the boiler. This will produce a lowering movement of the float 10 which will gradually straighten the toggle mechanism again until it has moved slightly past its straightened position, when the spring 20 will again snap the toggle into its collapsed position, as shown in Fig. 1, thus shutting off the flow of steam into the tank and opening the tank to the vent. This cycle of operations will be repeated indefinitely.

The movements of the valve are thus effected positively, and at the same time the construction is very simple and economical to manufacture. If it should be necessary to make repairs, the valve casing 4 can be removed, carrying the valves and the float with it.

While I have herein shown and described the best embodiment of my invention that I have so far devised, it will be understood that the invention may be embodied in other forms without departing from the spirit or scope thereof.

Having thus described my invention, what I desire to claim as new is:

1. In a return trap, the combination of a casing adapted to hold water, and a valve unit comprising a float in said casing, a vent leading from said casing, a steam inlet leading into said casing, a slidable valve having two valve members for controlling said vent and inlet, respectively, a toggle mechanism associated with said valve for sliding it from one position to another, a spring tending to collapse said toggle, and a float in said casing connected with said toggle mechanism and arranged to straighten it, said toggle and valve being arranged to permit the straightening of the toggle without moving said valve members off their seats.

2. In a return trap, the combination of a casing adapted to hold water, and a valve unit comprising a float in said casing, a vent leading from said casing, a steam inlet leading into said casing, a toggle link pivoted in said casing, a float arranged to move said link, a second toggle link pivoted at one end to the first link, a spring connected with the opposite end of the second link and arranged to be tensioned by the straightening of the toggle, and valve means arranged to be operated by said toggle and controlling said vent and inlet, said toggle and valve means being arranged to permit the straightening of the toggle without operating said valve means.

3. In a return trap, the combination of a casing adapted to hold water, and a valve unit comprising a float in said casing, a vent leading from said casing, a steam inlet leading into said casing, said vent and inlet being in alinement with each other, a reciprocating valve guided in said vent and inlet and having a valve member operative to close the vent when the valve is in operative position and another valve member for closing the inlet when the valve is in its opposite position, a float in said casing, a toggle mechanism arranged to be straightened by said float and serving to move said valve from one of its operative positions to the other, and a spring associated with said toggle for giving it a snap movement from one position to another, said toggle and valve being arranged to permit the straightening of the toggle without operating the valve.

4. In a return trap, the combination of a casing adapted to hold water, and a valve unit comprising a float in said casing, a vent leading from said casing, a steam inlet leading into said casing, a water inlet leading into said casing, valve members controlling said vent and inlet, a toggle mechanism for operating said members, a spring arranged to be tensioned by the straightening of the toggle and operative to collapse the toggle with a snap movement, said valve members being arranged to be operated by said toggle mechanism during the snap movement only of said mechanism, and said mechanism being actuated by said float.

5. In a return trap, the combination of a casing adapted to hold water, and a valve unit comprising a float in said casing, a vent leading from said casing, a steam inlet leading into said casing, a toggle link pivoted in said casing, a float arranged to move said link, a second toggle link pivoted at one end to an intermediate point on the first link, a member pivoted to the opposite end of said second link, a spring connected at one end to said member and arranged to be tensioned by the straightening of the toggle whereby said spring will collapse the toggle with a snap movement, and valve means having a lost motion connection with said member and arranged to be operated thereby during the snap movement only of the toggle, said valve means controlling said vent and inlet.

6. In a return trap, the combination of a casing adapted to hold water, and a valve unit comprising a float in said casing, a vent leading from said casing, a steam inlet leading into said casing, a toggle link pivoted in said casing, a float arranged to move said link, a second toggle link pivoted at one end to an intermediate point on the first link, a member pivoted to the opposite end of said second link, a spring connected at one end to said member and arranged to be tensioned by the straightening of the toggle whereby said spring will collapse the toggle with a snap movement, a slidable valve having a lost motion connection with said member and arranged to be operated thereby during the snap movement only of the toggle in either direction, said slidable valve having valve elements controlling said vent and said inlet.

7. In a return trap, the combination of a main casing adapted to hold water, and a valve unit comprising a float in said casing, a vent leading from said casing, a steam inlet leading into said casing, valve members controlling said vent and inlet, a valve casing in which said valve members are mounted, said valve casing being removably secured to said main casing, a toggle mechanism for operating said valve members, and a float in said main casing for actuating said toggle mechanism, said toggle mechanism and float being supported on said valve casing for removal therewith from the main casing.

In testimony whereof I have signed my name to this specification.

FRANK M. WEBSTER.